(12) United States Patent
Kim et al.

(10) Patent No.: US 12,468,424 B2
(45) Date of Patent: Nov. 11, 2025

(54) ELECTRONIC DEVICE INCLUDING A SENSOR LAYER FOR SENSING TYPES OF INPUT

(71) Applicant: Samsung Display Co., LTD., Yongin-si (KR)

(72) Inventors: Youngkuk Kim, Yongin-si (KR); Sungin Ro, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/499,565

(22) Filed: Nov. 1, 2023

(65) Prior Publication Data

US 2024/0264702 A1 Aug. 8, 2024

(30) Foreign Application Priority Data

Feb. 8, 2023 (KR) .................. 10-2023-0016756

(51) Int. Cl.
*G06F 3/041* (2006.01)
*G06F 3/044* (2006.01)
*G09G 3/3233* (2016.01)

(52) U.S. Cl.
CPC ...... *G06F 3/04184* (2019.05); *G06F 3/04162* (2019.05); *G09G 3/3233* (2013.01); *G06F 3/0446* (2019.05); *G09G 2300/0819* (2013.01); *G09G 2300/0852* (2013.01); *G09G 2300/0861* (2013.01); *G09G 2354/00* (2013.01)

(58) Field of Classification Search
None
See application file for complete search history.

(56) References Cited

U.S. PATENT DOCUMENTS

| 9,404,735 B2 | 8/2016 | Paul et al. |
| 9,542,030 B2 | 1/2017 | Kim et al. |
| 10,964,259 B1 * | 3/2021 | Chang .................. G09G 3/3225 |

(Continued)

FOREIGN PATENT DOCUMENTS

| JP | 6567399 B2 | 8/2019 |
| KR | 20180031501 A | 3/2018 |

(Continued)

OTHER PUBLICATIONS

Bang et al., "A Hybrid AMOLED Driver IC for Real-Time TFT Nonuniformity Compensation," IEEE Journal of Solid-State Circuits, Vo. 51., No. 4, Apr. 2016, 13 pages.

(Continued)

*Primary Examiner* — Kirk W Hermann
(74) *Attorney, Agent, or Firm* — CANTOR COLBURN LLP

(57) ABSTRACT

An electronic device includes a display layer having pixels and configured to operate in units of one frame including a blank period and a data input period, and a sensor layer disposed on the display layer, and configured to sense a first type input and a second type input different from the first type input, wherein the sensor layer may be driven to sense the first type input and the second type input in the blank period, and, in one frame, a number of times that the second type input is sensed may be greater than a number of times that the first type input is sensed.

14 Claims, 8 Drawing Sheets

(56) References Cited

U.S. PATENT DOCUMENTS

| | | | | |
|---|---|---|---|---|
| 2014/0160067 | A1* | 6/2014 | Kim | G06F 3/04166 |
| | | | | 345/174 |
| 2016/0370915 | A1* | 12/2016 | Agarwal | G06F 3/0443 |
| 2018/0081492 | A1* | 3/2018 | Kim | G06F 3/0442 |
| 2018/0113549 | A1* | 4/2018 | Park | G06F 3/03545 |
| 2018/0164909 | A1* | 6/2018 | Bae | G06F 3/04162 |
| 2019/0004649 | A1* | 1/2019 | Ju | G06F 3/0446 |
| 2019/0102021 | A1* | 4/2019 | Jang | G06F 3/04166 |
| 2019/0114980 | A1* | 4/2019 | Kim | G02F 1/136213 |
| 2020/0201480 | A1* | 6/2020 | Choi | G06F 3/04162 |
| 2020/0393949 | A1* | 12/2020 | Kim | G06F 3/0446 |
| 2021/0294493 | A1* | 9/2021 | Asakura | G06F 3/046 |
| 2022/0351673 | A1* | 11/2022 | Kim | G09G 3/32 |

FOREIGN PATENT DOCUMENTS

| | | | |
|---|---|---|---|
| KR | 20170087442 A | * | 4/2018 |
| KR | 20180045944 A | | 5/2018 |
| KR | 20190077684 A | | 7/2019 |
| KR | 20220148972 A | | 11/2022 |

OTHER PUBLICATIONS

Extended European Search Report mailed Dec. 20, 2024 in EP Application No. 24152986.6, 21 pages.

Huo et al., "The Limitation of Threshold-Voltage Compensation Range for Internal Compensation Circuit in the AM-MiniLED Pixel Structure," The 4th Asia Energy and Electrical Symposium, 2022, 5 pages.

Pal et al., "Threshold voltage compensation 6T2C-pixel circuit design using OTFT for flexible display," Microelectronics Journal 102 (2020), 7 pages.

* cited by examiner

ELECTRONIC DEVICE INCLUDING A SENSOR LAYER FOR SENSING TYPES OF INPUT

This application claims priority to Korean Patent Application No. 10-2023-0016756, filed on Feb. 8, 2023, and all the benefits accruing therefrom under 35 U.S.C. § 119, the content of which in its entirety is herein incorporated by reference.

BACKGROUND

1. Field

The present disclosure relates to an electronic device having improved sensing performance.

2. Description of the Related Art

A multi-media electronic device such as a television, a mobile phone, a tablet computer, a navigator, a game machine, or the like includes a display device for displaying images. In addition to a typical means of input such as a button, a keyboard, a mouse or the like, the electronic device may be equipped with various input sensors providing various ways of touch-based input that may allow a user to intuitively and conveniently input information or commands. The input sensors may sense touches or pressure by the body of the user.

SUMMARY

The present disclosure provides an electronic device with improved sensing performance.

An embodiment provides an electronic device including a display layer including pixels and configured to operate in units of one frame including a blank period and a data input period, and a sensor layer disposed on the display layer, and configured to sense a first type input and a second type input different from the first type input, wherein the sensor layer is driven to sense the first type input and the second type input in the blank period, and, in one frame, a number of times that the second type input is sensed is greater than a number of times that the first type input is sensed.

In an embodiment, a frame frequency of the display layer may be the same as a sensing frequency corresponding to a period in which the sensor layer senses the first type input.

In an embodiment, a first duration of the blank period may be longer than a second duration of the data input period.

In an embodiment, a sensing frequency corresponding to a period in which the sensor layer senses the second type input may be double a frame frequency of the display layer.

In an embodiment, the blank period may include a first sub-period and a second sub-period following the first sub-period, and a duration of the first sub-period may correspond to half of a reciprocal of a frame frequency of the display layer.

In an embodiment, a duration of the second sub-period may be shorter than about 1 ms or longer than about 0 ms.

In an embodiment, the sensor layer may be driven to sense the second type input and the first type input in the first sub-period, and to sense the second type input in the second sub-period.

In an embodiment, a duration of the blank period may be at most a duration of the data input period.

In an embodiment, the sensor layer may be driven to sequentially sense a 2-1st type input corresponding to the second type input, the first type input, and a 2-2nd type input corresponding to the second type input in the blank period.

In an embodiment, a first time interval, in a first frame, between a start time of an operation for sensing the 2-1st type input and a start time of an operation for sensing the 2-2nd type input may be shorter than a second time interval between a start time of an operation for sensing the 2-2nd type input in the first frame and a start time of an operation for sensing the 2-1st type input in a second frame following the first frame.

In an embodiment, the first time interval may be at most half of a reciprocal of a frame frequency of the display layer.

In an embodiment, the second time interval may be at least half of a reciprocal of a frame frequency of the display layer.

In an embodiment, the display layer may be driven at a first frame frequency, and a 1H time of the display layer may correspond to a 1H time calculated with a second frame frequency higher than the first frame frequency.

In an embodiment, each of the pixels may include a pixel circuit including a driving transistor and a light emitting element electrically connected to the pixel circuit, and a threshold voltage of the driving transistor may be configured to be compensated in a compensation period, and a duration of the compensation period is at least 2H times of the display layer.

In an embodiment, an electronic device includes a display layer including pixels and configured to operate in units of one frame including a blank period and a data input period, a sensor layer disposed on the display layer, and a sensor driver configured to drive the sensor layer, wherein the sensor driver in the blank period is configured to operate once in a first mode in which an input by a touch is sensed, and to operate twice in a second mode in which an input by an input device configured to output a downlink signal is sensed.

In an embodiment, a first duration of the blank period may be longer than a second duration of the data input period.

In an embodiment, the blank period may include a first sub-period and a second sub-period following the first sub-period, a duration of the first sub-period may correspond to half of a reciprocal of a frame frequency of the display layer, a second duration of the second sub-period may be shorter than about 1 ms and longer than about 0 ms, and the sensor driver may be configured to sequentially operate in the second mode and the first mode in the first sub-period, and operate in the second mode in the second sub-period.

In an embodiment, a duration of the blank period may be at most a duration of the data input period.

In an embodiment, the sensor layer may be configured to sequentially sense a 2-1st type input corresponding to the input by the input device, a first type input corresponding to the input by the touch, and a 2-2nd type input corresponding to the input by the input device, and a first time interval, in a first frame, between a start time of an operation for sensing the 2-1st type input and a start time of an operation for sensing the 2-2nd type input may be shorter than a second time interval between a start time of an operation for sensing the 2-2nd type input in the first frame and a start time of an operation for sensing the 2-1st type input in a second frame.

In an embodiment, a frame frequency of the display layer may be the same as a first sensing frequency corresponding to a period in which the sensor layer operates in the first mode, and a second sensing frequency corresponding to a period in which the sensor layer operates in the second mode may be higher than the first sensing frequency.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1:
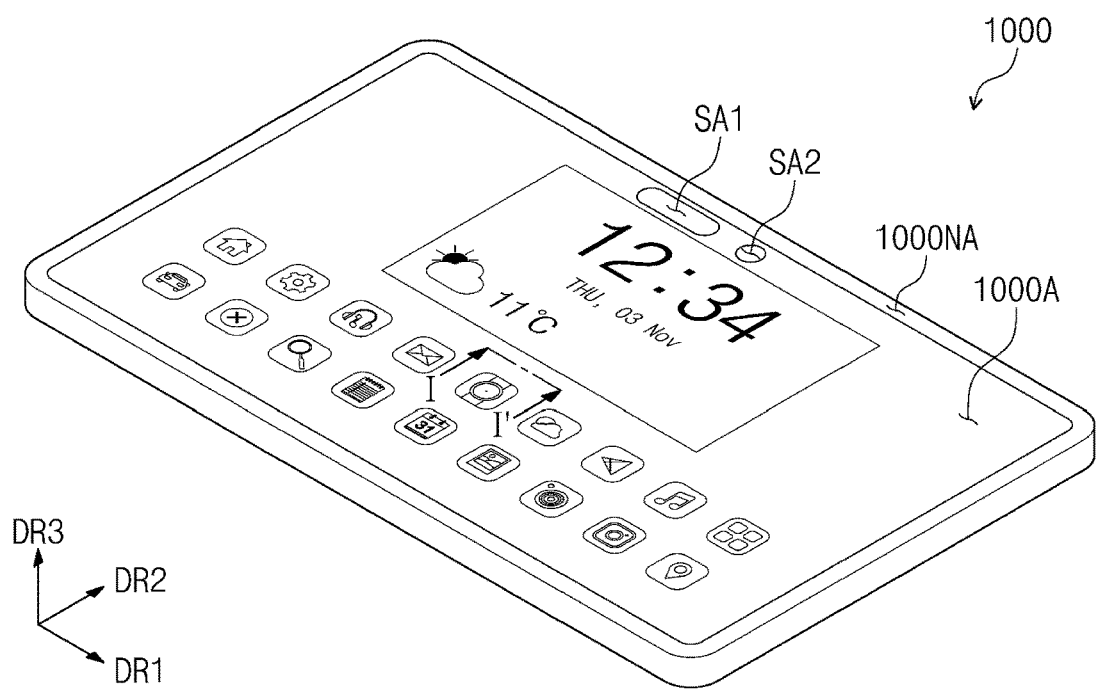
FIG. 1 is a perspective view of an electronic device according to an embodiment of the invention.

The invention now will be described more fully hereinafter with reference to the accompanying drawings, in which various embodiments are shown. This invention may however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element or layer is referred to as being related to another element, such as being "on", "connected to" or "coupled to" another element or layer, it can be directly on, connected or coupled to the other element or intervening third elements may be present.

Like reference numerals in the drawings refer to like elements. In addition, in the drawings, the thickness and the ratio and the dimension of the element are exaggerated for effective description of the technical contents. The term "and/or" includes any and all combinations of one or more of the associated items.

Terms such as first, second, and the like may be used to describe various components, but these components should not be limited by the terms. These terms are only used to distinguish one element from another. For instance, a first component may be referred to as a second component, or similarly, a second component may be referred to as a first component, without departing from the scope of the disclosure. The singular expressions include plural expressions unless the context clearly dictates otherwise.

The terminology used herein is for the purpose of describing particular embodiments only and is not intended to be limiting. As used herein, "a", "an," "the," and "at least one" do not denote a limitation of quantity, and are intended to include the plural forms as well, unless the context clearly indicates otherwise. Within the Figures and the text of the disclosure, a reference number indicating a singular form of an element may also be used to reference a plurality of the singular element.

In addition, the terms such as "under", "lower", "on", and "upper" are used for explaining associations of items illustrated in the drawings. The terms are used as a relative concept and are described with reference to the direction indicated in the drawings.

It should be understood that the terms "comprise" or "have" are intended to specify the presence of stated features, integers, steps, operations, elements, components, or combinations thereof in the disclosure, but do not preclude the presence or addition of one or more other features, integers, steps, operations, elements, components, and/or combinations thereof.

Terms of "part" or "unit" means a software component or hardware component performing specific functions. The hardware component may include, for example, a field-programmable gate array (FPGA) or an application-specific integrated circuit (ASIC). The software component may refer to an executable code and/or data used by an executable code in an addressable recording medium. Accordingly, software components may be, for example, object-oriented software components, class components, and task components, and include processors, functions, attributes, procedures, subroutines, program code segments, drivers, firmware, microcode, circuits, data, databases, data structures, tables, arrays, and/or variables.

As used herein, being "disposed directly on" may mean that there is no additional layer, film, region, plate, or the like between a part and another part such as a layer, a film, a region, a plate, or the like. For example, being "disposed directly on" may mean that two layers or two members are disposed without using an additional member such as an adhesive member, therebetween.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which example embodiments belong. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments of the invention will be described with reference to the accompanying drawings.

FIG. 1 is a perspective view of an electronic device 1000 according to an embodiment of the invention.

In an embodiment and referring to FIG. 1, the electronic device 1000 may be a device activated according to an electrical signal. For example, the electronic device 1000 may be a mobile phone, a tablet computer, a vehicle navigator, a game device, and/or a wearable device, but is not limited thereto. In FIG. 1, the electronic device 1000 is shown as a tablet computer.

In an embodiment, the electronic device 1000 may be defined with an active area 1000A and a non-active area 1000NA. The electronic device 1000 may 1000 may display an image through the display area 1000A. The active area 1000A may include a plane defined by a first direction DR1 and a second direction DR2. The non-active area 1000NA may surround the periphery of the active area 1000A. In an embodiment of the invention, the non-active area 1000NA may be omitted.

In an embodiment of the invention, one or more sensor areas SA1, SA2 may be defined in the active area 1000A. FIG. 1 shows two example sensor areas SA1, SA2, but the number of sensor areas SA1, SA2 provided to the electronic device 1000 is not limited thereto. Each of the sensor areas SA1, SA2 may overlap at least one sensor. For example, each of the sensor areas SA1, SA2 may overlap a front camera module, an ambient light sensor, a proximity sensor, an infrared camera, and/or a dot projector.

In an embodiment of the invention, each of the sensor areas SA1, SA2 may be an inactive area in which images are not displayed and touches are not detected. In this case, it may be understood that the sensor areas SA1, SA2 are surrounded by the active area 1000A. In an embodiment of the invention, each of the sensor areas SA1, SA2 may be an active area in which images are displayed and touches are detected. Alternatively, each of the sensor areas SA1, SA2 may be an active area in which images are displayed, but touches are not detected. In this case, it may be understood that the sensor areas SA1, SA2 are portions of the active area 1000A.

In an embodiment of the invention, the sensor areas SA1, SA2 may be omitted. Alternatively, the sensor areas SA1, SA2 may be defined in the non-active area 1000NA.

In an embodiment, the thickness direction of the electronic device 1000 may be parallel to a third direction DR3 that intersects with the first direction DR1 and the second direction DR2. Accordingly, the front surfaces (or top surfaces) and the rear surfaces (or bottom surfaces) of members constituting the electronic device 1000 may be defined on the basis of the third direction DR3.

FIG. 1 shows an embodiment of a bar-type or plate-type electronic device 1000, but the embodiment of the invention is not limited thereto. For example, the following description may be applied to various electronic devices including a foldable, rollable, and/or slidable electronic device 1000.

Figure 2:
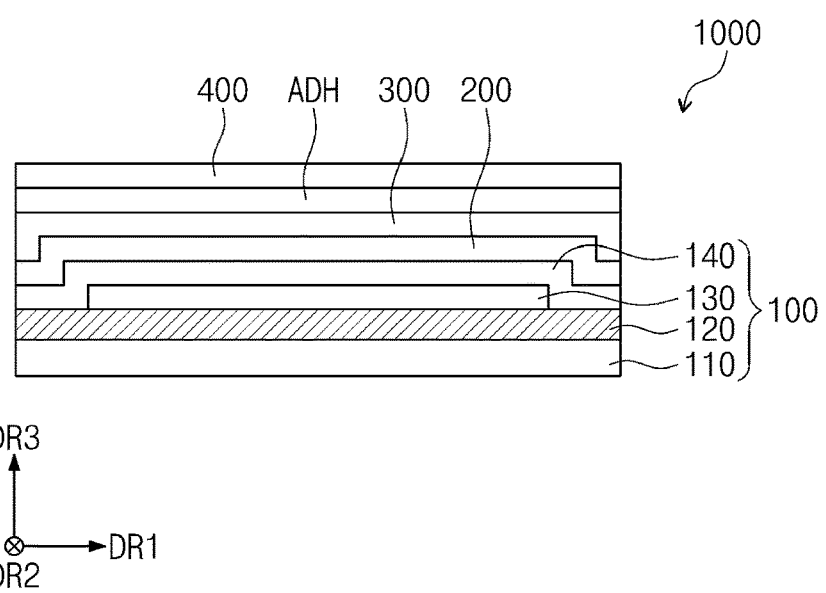
FIG. 2 is a schematic cross-sectional view of an electronic device according to an embodiment of the invention.

FIG. 2 is a schematic cross-sectional view of the electronic device 1000 according to an embodiment of the invention.

In an embodiment and referring to FIG. 2, the electronic device 1000 may include a display layer 100, a sensor layer 200, an anti-reflection layer 300, an adhesive layer ADH, and a window 400.

In an embodiment, the display layer 100 may include a base layer 110, a circuit layer 120, a light emitting element layer 130, and an encapsulation layer 140.

In an embodiment, the base layer 110 may be a member providing a base surface on which the circuit layer 120 is disposed. The base layer 110 may be a glass substrate, a silicon substrate, a metal substrate, and/or a polymer substrate. However, the embodiment of the invention is not limited thereto, and the base layer 110 may be an inorganic layer, an organic layer, and/or a composite material layer.

In an embodiment, the circuit layer 120 may be disposed on the base layer 110. The circuit layer 120 may include an insulation layer, a semiconductor pattern, a conductive pattern, signal lines, and the like. The insulation layer, the semiconductor layer, and the conductive layer are defined on the base layer 110 in a manner of coating, deposition, and/or the like, and then, the insulation layer, the semiconductor layer, and the conductive layer may be selectively patterned through a plurality of photolithography processes. Then, the semiconductor pattern, the conductive pattern, and the signal lines included in the circuit layer 120 may be provided.

In an embodiment, the light emitting element layer 130 may be disposed on the circuit layer 120. The light emitting module 130 may include light emitting elements. For example, the light emitting element layer 130 may include an organic light emitting material, an inorganic light emitting material, an organic-inorganic light emitting material, a quantum dot, a quantum rod, a micro, and/or a nano LED.

In an embodiment, the encapsulation layer 140 may be disposed on the light emitting element layer 130. The encapsulation layer 140 may protect the light emitting element layer 130 from foreign matter such as moisture, oxygen and/or dust particles.

In an embodiment, the sensor layer 200 may be disposed on the display layer 100. The sensor layer 200 may be disposed on the display layer 100 through continuous processes. In this case, the sensor layer 200 may be expressed as being directly disposed on the display layer 100. Being directly disposed may mean that a third element is not disposed between the sensor layer 200 and the display layer 100. In other words, a separate adhesive member may not be disposed between the sensor layer 200 and the display layer 100. Alternatively, the sensor layer 200 may be combined with the display layer 100 through an adhesive member. The adhesive member may include a typical adhesive and/or a pressure sensitive adhesive.

In an embodiment, the anti-reflection layer 300 may be disposed on the sensor layer 200. The anti-reflection layer 300 may reduce a reflection ratio of external light incident from the outside of the electronic device 1000. The anti-reflection layer 300 may be directly disposed on the sensor layer 200. However, the invention is not limited thereto, and an adhesive member may be disposed between the anti-reflection layer 300 and the sensor layer 200.

In an embodiment, the window 400 may be disposed on the anti-reflection layer 300. The window 400 may include an insulation material that is optically transparent. For example, the window 400 may include glass and/or plastic. The window 400 may have a multilayer structure or a single-layer structure. For example, the window 400 may include a plurality of plastic films bonded with an adhesive, and/or a glass substrate and a plastic film bonded with an adhesive.

In an embodiment, the adhesive layer ADH may be disposed between the anti-reflection layer 300 and the window 400. The adhesive layer ADH may include a typical adhesive and/or a pressure sensitive adhesive having light permeability. The adhesive layer ADH disposed between the anti-reflection layer 300 and the window 400 may be omitted.

Figure 3:
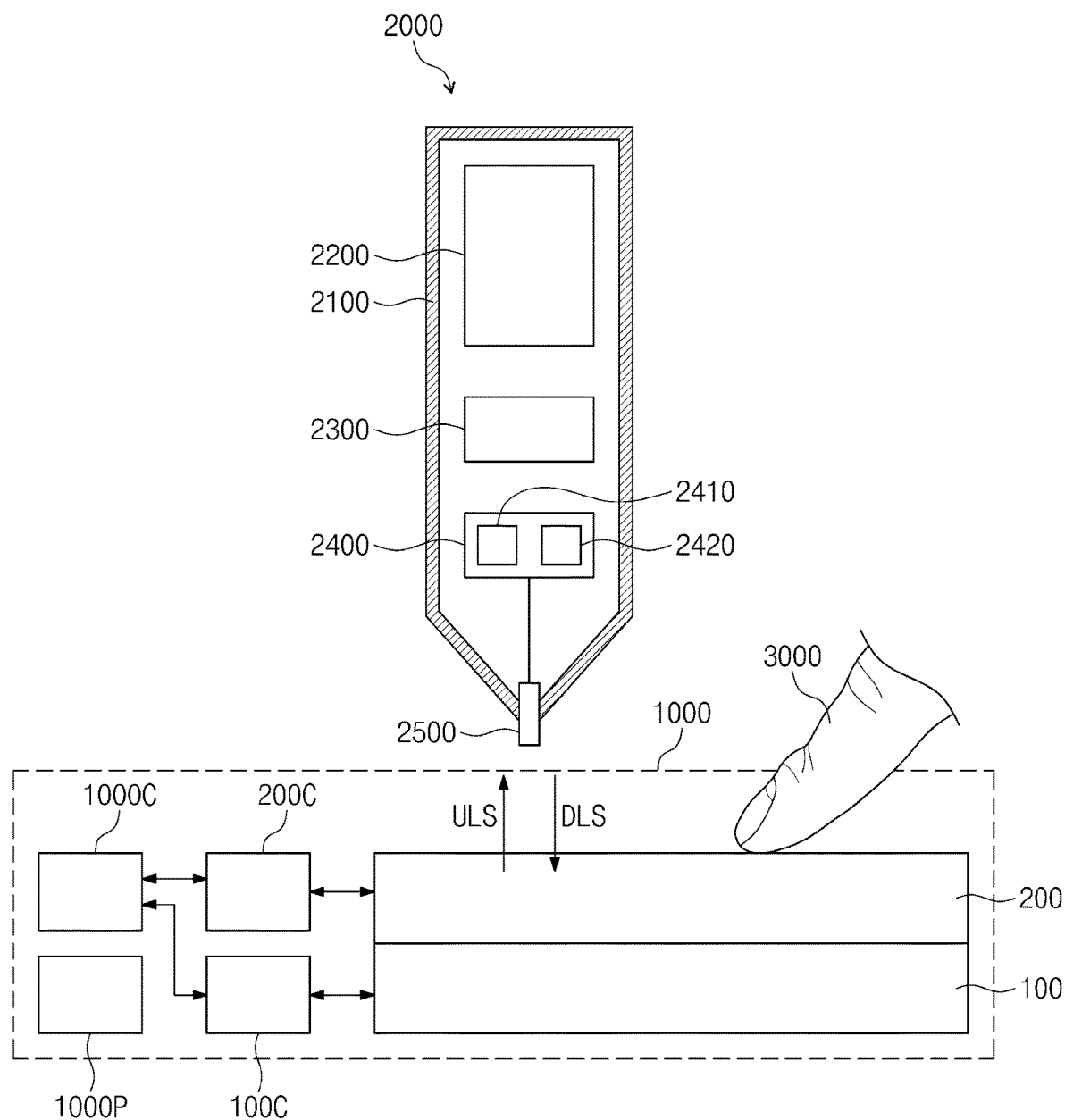
FIG. 3 is a block diagram for describing the operation of the electronic device according to an embodiment of the invention.

FIG. 3 is a graphical block diagram describing the operation of the electronic device 1000 according to an embodiment of the invention.

In an embodiment and referring to FIG. 3, the electronic device 1000 may include a display layer 100, a sensor layer 200, a display driver 100C, a sensor driver 200C, a main driver 1000C, and a power supply circuit 1000P.

In an embodiment, the display layer 100 may be a component configured to substantially generate images. The display layer 100 may be an emissive display layer, for example, an organic light emitting display layer, an inorganic light emitting display layer, an organic-inorganic light emitting display layer, a quantum dot display layer, a micro LED display layer, and/or a nano LED display layer.

In an embodiment, the sensor layer 200 may be disposed on the display layer 100. The sensor layer 200 may sense an external input applied externally. For example, the sensor layer 200 may sense an active input from the input device 2000 (or referred to as a second type input) and a passive input by touch 3000 (or referred to as a first type input). The touch 3000 may include all input means such as the body of a user, and/or an input device (e.g., a pen) that may provide a change in capacitance.

In an embodiment, the main driver 1000C may control the overall operations of the electronic device 1000. For example, the main driver 1000C may control the operations of the display driver 100C and the sensor driver 200C. The main driver 1000C may include at least one microprocessor, and may be referred to as a host. The main driver 1000C may further include a graphic controller.

In an embodiment, the display driver 100C may drive the display layer 100. The display driver 100C may receive image data and/or control signals from the main control unit 1000C. The control signals may include various signals. For example, the control signals may include an input vertical sync signal, a main clock, a data enable signal, and the like.

In an embodiment, the sensor driver 200C may drive the sensor layer 200. The sensor driver 200C may receive a control signal from the main driver 1000C. The control signal may include a mode determination signal and/or a clock signal for determining a driving mode of the sensor driver 200C. On the basis of the control signal, the sensor driver 200C may be selectively driven as a first mode for sensing a passive input and/or a second mode for sensing an active input.

In an embodiment, the power supply circuit 1000P may include a power management integrated circuit (PMIC). The power supply circuit 1000P may generate a plurality of driving voltages for driving the display layer 100, the sensor layer 200, the display driver 100C, and/or the sensor driver 200C. For example, the plurality of driving voltages may include a gate high voltage, a gate low voltage, an ELVSS voltage, an ELVDD voltage, an initialization voltage and/or the like, but are not limited thereto.

In an embodiment, the electronic device 1000 and the input device 2000 may communicate bi-directionally. The electronic device 1000 may provide uplink signals ULS to the input device 2000. For example, the uplink signals ULS may include a synchronization signal and/or information about the electronic device 1000, but is not limited thereto. The input device 2000 may provide downlink signals DLS to the electronic device 1000. The downlink signals DLS may include a synchronization signal and/or state information about the input device 2000. For example, the downlink signals DLS may include coordinate information, battery information, and/or inclination information for the input device 200, and/or various pieces of information stored in the input device 2000, but are not particularly limited thereto.

In an embodiment, the input device 2000 may include a housing 2100, a power supply 2200, a control unit 2300, a communication module 2400, and a pen tip 2500. However, the components constituting the input device 2000 are not limited to the above-listed components. For example, the input device 2000 may further include an electrode switch configured to switch to a signal transmission mode and/or a signal reception mode, a pressure sensor configured to sense pressure, a memory configured to store prescribed information, a rotation sensor configured to sense rotation, and/or the like.

In an embodiment, the housing 2100 may have a pen shape, and have an accommodation space therein. The accommodation space defined in the housing 2100 may contain the power supply 2200, the pen controller 2300, the communication module 2400, and the pen electrode 2500.

The power supply 2200 may provide power to the control unit 2300, the communication module 2400 or the like, in the input device 2000. The power supply 2200 may include a battery or a high density capacitor.

In an embodiment, the control unit 2300 may control the operation of the input device 2000. The control unit 2300 may be an application-specific integrated circuit (ASIC). The control unit 2300 may be configured to operate according to a designed program.

In an embodiment, the communication module 2400 may include a transmission circuit 2410 and a reception circuit 2420. The transmission circuit 2410 may output the downlink signals DLS to the sensor layer 200. The reception circuit 2420 may receive the uplink signals ULS provided from the input sensor 200. The transmission circuit 2410 may receive a signal from the control unit 2300 to modulate the received signal to a signal that may be sensed by the input sensor 200, and the reception circuit 2420 may modulate the signal from the sensor layer 200 to a signal that may be processed by the control unit 2300.

In an embodiment, the pen tip 2500 may be electrically connected to the communication module 2400. A portion of the pen tip 2500 may protrude from the housing 2100. Alternatively, the input device 2000 may further include a cover housing for covering the pen tip 2500 exposed from the housing 2100. Alternatively, the pen tip 2500 may be embedded inside the housing 2100.

Figure 4:
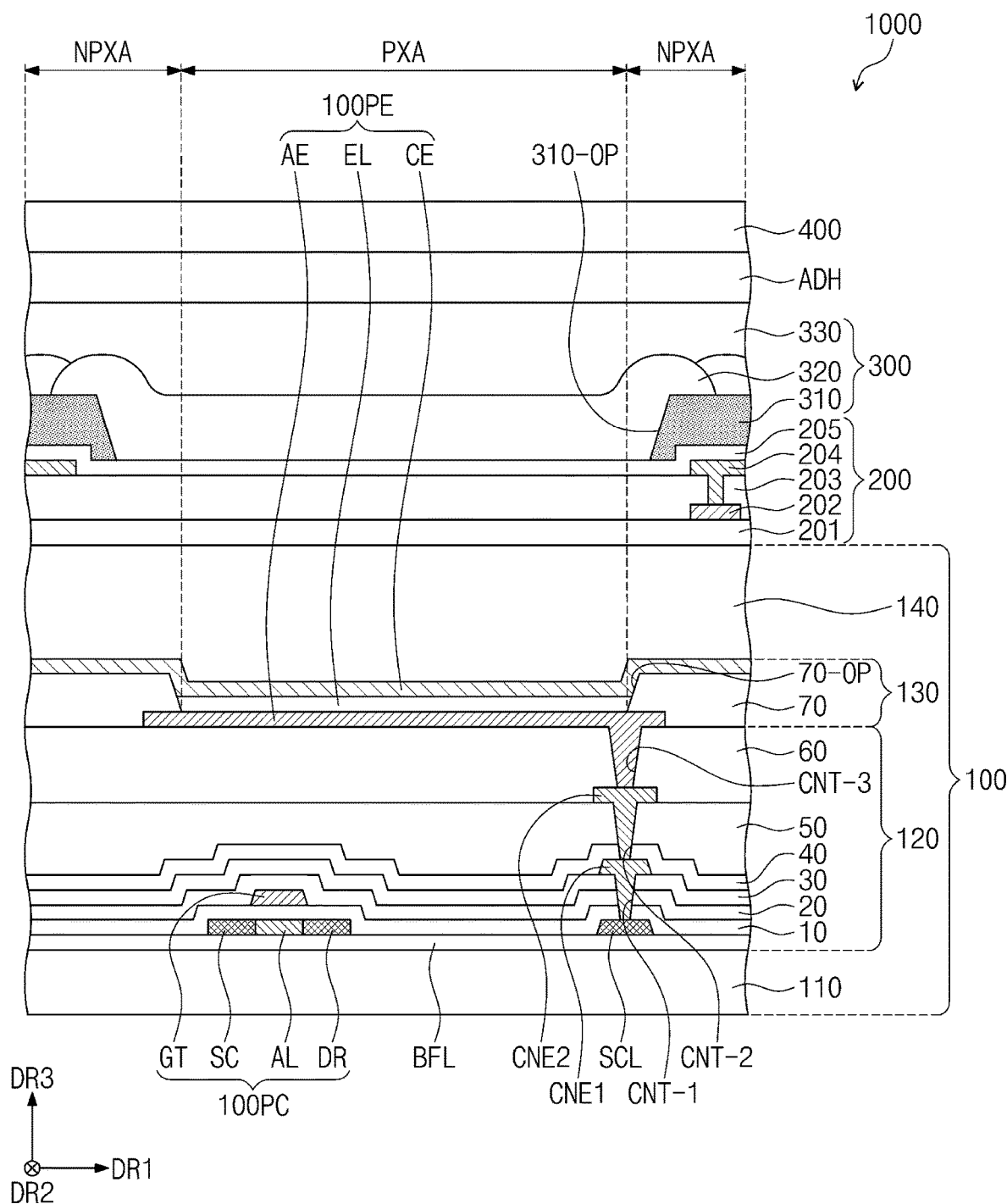
FIG. 4 is a cross-sectional view of an electronic device according to an embodiment of the invention.

FIG. 4 is a cross-sectional view of the electronic device 1000 according to an embodiment of the invention.

In an embodiment and referring to FIG. 4, the electronic device 1000 may include the display layer 100, the sensor layer 200, the anti-reflection layer 300, the adhesive layer ADH, and the window 400. The adhesive layer ADH may be disposed between the anti-reflection layer 300 and the window 400. The adhesive layer ADH may include a typical adhesive and/or pressure sensitive adhesive having light permeability.

In an embodiment, at least one inorganic layer is provided on the top surface of the base layer 110. The inorganic layer may include at least one of aluminum oxide, titanium oxide, silicon oxide, silicon oxynitride, zirconium oxide and/or hafnium oxide. The inorganic layer may be provided in multiple layers. The multi-layered inorganic layer may provide a barrier layer and/or a buffer layer.

In an embodiment, the display layer 100 is shown as including a buffer layer BFL. The buffer layer BFL may enhance the bonding force between the base layer 110 and a semiconductor pattern. The buffer layer BFL may include at least one of silicon oxide, silicon nitride, and/or silicon oxynitride. For example, the buffer layer BFL may include a structure in which silicon oxide layers and silicon nitride layers are alternately laminated.

In an embodiment, the semiconductor pattern may be disposed on the buffer layer BFL. The semiconductor pattern may correspond to one of a plurality of patterns of a semiconductor layer disposed on the buffer layer BFL. The semiconductor pattern may include a metal oxide. In an embodiment of the invention, the semiconductor pattern includes polysilicon. However, the embodiment of the invention is not limited thereto, and the semiconductor pattern may also include amorphous silicon, low-temperature polycrystalline silicon, and/or oxide semiconductor.

The metal oxide semiconductor may include a crystalline and/or amorphous oxide semiconductor. For example, the oxide semiconductor may include a metal oxide of zinc (Zn), indium (In), gallium (Ga), tin (Sn), titanium (Ti) and/or the like, and/or a mixed material of a metal such as zinc (Zn), indium (In), gallium (Ga), tin (Sn), or titanium (Ti), and/or an oxide thereof. The oxide semiconductor may include indium-tin oxide (ITO), indium-gallium-zinc oxide (IGZO), zinc oxide (ZnO), indium-zinc oxide (IZnO), zinc-indium oxide (ZIO), indium oxide (InO), titanium oxide (TiO), indium-zinc-tin oxide (IZTO), zinc-tin oxide (ZTO) and/or the like.

In an embodiment, the semiconductor pattern may include a plurality of areas divided according to whether a metal oxide is reduced. An area in which the metal oxide is reduced (hereinafter, a reduction area) has high conductivity in comparison to an area in which the metal oxide is not reduced (hereinafter, non-reduction area). The reduction area may substantially serve as a source/drain or a signal line of the transistor. The non-reduction area substantially corresponds to a semiconductor area (or channel) of the transistor. In other words, a portion of the semiconductor pattern may be the semiconductor area of the transistor, another portion may be a source/drain of the transistor, and still another portion may be a signal delivery area.

In an embodiment, each pixel may have an equivalent circuit including five transistors, two capacitors, and/or a light emitting element, and the equivalent circuit of the pixel may be modified in various types. FIG. 4 shows one example transistor 100PC and an example light emitting element 100PE included in the pixel.

In an embodiment, a source area SC, a channel area AL, and a drain area DR of the transistor 100PC may be provided from the semiconductor pattern. The source area SC and the drain area DR may extend in opposite directions from each other from the channel area AL in a cross-sectional view. FIG. 4 illustrates a portion of a signal connection line SCL provided from the semiconductor pattern. Although not illustrated separately, the signal connection line SCL may be connected to the drain area DR of the transistor 100PC in a plan view.

In an embodiment, a first insulation layer 10 may be disposed on the buffer layer BFL. The first insulation layer 10 may commonly overlap the plurality of pixels and cover the semiconductor pattern. The first insulation layer 10 may include an inorganic material and/or organic material, and have a single layer and/or multilayer structure. The first insulation layer 10 may include at least one among aluminum oxide, titanium oxide, silicon oxide, silicon nitride, silicon oxynitride, zirconium oxide, and/or hafnium oxide. In an embodiment, the first insulation layer 10 may be a single silicon oxide layer. Not only the first insulation layer 10, but also the insulation layer of the circuit layer 120 to be described below may include an inorganic material and/or organic material, and have a single layer and/or multilayer structure. The inorganic material layer may include at least one among the aforementioned materials, but is not limited thereto.

In an embodiment, a gate GT of the transistor 100PC may be disposed on the first insulation layer 10. The gate GT may be a portion of a metal pattern. The gate GT overlaps the channel area AL. The gate GT may function as a mask in a process of doping the semiconductor pattern.

In an embodiment, a second insulation layer 20 may be disposed on the first insulation layer 10 and cover the gate GT. The second insulation layer 20 may commonly overlap the pixels. The second insulation layer 20 may include an inorganic layer and/or organic layer, and have a single layer and/or multilayer structure. The second encapsulation layer 20 may include any one among silicon oxide, silicon nitride, and/or silicon oxynitride. In an embodiment, the second insulation layer 20 may have a multilayer structure including a silicon oxide layer and/or a silicon nitride layer.

In an embodiment, a third insulation layer 30 may be disposed on the second insulation layer 20. The third insulation layer 30 may have a single layer and/or multilayer structure. For example, the third insulation layer 30 may have a multilayer structure including a silicon oxide layer and a silicon nitride layer.

In an embodiment, a first connection electrode CNE1 may be disposed on the third insulation layer 30. The first connection electrode CNE1 may be connected to a signal connection line SCL through a contact hole CNT-1 penetrating through the first to third insulation layers 10, 20, and 30, respectively.

In an embodiment, a fourth insulation layer 40 may be disposed on the third insulation layer 30. The fourth insulation layer 40 may be a single silicon oxide layer. A fifth insulation layer 50 may be arranged on the fourth insulation layer 40. The fifth insulation layer 50 may be an organic layer.

In an embodiment, a second connection electrode CNE2 may be disposed on the fifth insulation layer 50. The second connection electrode CNE2 may be connected to the first connection electrode CNE1 through a contact hole CNT-2 penetrating through the fourth insulation layer 40 and the fifth insulation layer 50.

In an embodiment, a sixth insulation layer 60 may be disposed on the fifth insulation layer 50 and cover the second connection electrode CNE2. The sixth insulation layer 60 may be an organic layer.

In an embodiment, the light emitting element layer 130 may be disposed on the circuit layer 120. The light emitting layer 130 may include a light emitting element 100PE. For example, the light emitting element layer 130 may include an organic light emitting material, an inorganic light emitting material, an organic-inorganic light emitting material, and/or a quantum dot, quantum rod, micro, or nano LED. Hereinbelow, an example in which the light emitting element 100PE is an organic light emitting element will be described, but the example is not limited thereto.

In an embodiment, the light emitting element 100PE may include a first electrode AE, an emissive layer EL, and a second electrode CE.

In an embodiment, the first electrode AE may be disposed on a sixth insulation layer 60. The first electrode AE is connected to the second connection electrode CNE2 through a contact hole CNT-3 penetrating through the sixth insulation layer 60.

In an embodiment, a pixel definition layer 70 may be arranged on the sixth insulation layer 60 and cover a portion of the first electrode AE. The pixel definition layer 70 is defined with an opening 70-OP. The opening 70-OP of the pixel definition layer 70 exposes at least a portion of the first electrode AE.

In an embodiment, the active area 1000A (see FIG. 1) may include a light emitting area PXA and a non-light emitting area NPXA adjacent to the light emitting area PXA. The non-light emitting area NPXA may surround the light emitting area PXA. In an embodiment, the light emitting area PXA is defined in correspondence to a partial area of the first electrode AE exposed by an opening 70-OP.

In an embodiment, the light emitting layer EL may be disposed on a first electrode AE. The light emitting layer EL may be disposed on an area corresponding to the opening 70-OP. In other words, the light emitting layer EL may be separately provided in each of the plurality of pixels. When the light emitting layer EL is separately provided in each of the pixels, each of the light emitting layers EL may emit light of at least one of blue, red, or green color. However, the embodiment of the invention is not limited thereto, and the light emitting layer EL may be connected to the pixels and commonly included. In this case, the light emitting layer EL may provide blue light or white light.

In an embodiment, a second electrode CE may be disposed on the light emitting layer EL. The second electrode CE may have an integrated shape, and be commonly disposed in the plurality of pixels.

In an embodiment, although not shown in the drawing, the first electrode AE and the light emitting layer EL may have a hole control layer interposed therebetween. The hole control layer HCL may be commonly disposed on the light emitting area PXA and the non-light emitting area NPXA. The hole control layer HCL may include a hole transport layer, and further include a hole injection layer. An electron control layer may be disposed between the light emitting layer EL and the second electrode CE. The electron control layer may include an electron transport layer, and further include an electron injection layer. The hole control layer and the electron control layer may be commonly provided in the plurality of pixels through an open mask and/or an inkjet process.

In an embodiment, an encapsulation layer 140 may be disposed on the light emitting element layer 130. The encapsulation layer 140 may include an inorganic layer, an organic layer, and an inorganic layer that are sequentially laminated, but the layers defining the encapsulation layer 140 are not limited thereto. The inorganic layers may protect the light emitting element layer 130 from moisture and oxygen, and the organic layer may protect the light emitting element layer 130 from foreign matter such as dust particles. The inorganic layers may include a silicon nitride layer, a silicon oxynitride layer, a silicon oxide layer, a titanium oxide layer, an aluminum oxide layer and/or the like. The organic layer may include an acrylic-based organic layer, but is not limited thereto.

In an embodiment, the sensor layer 200 may include a base layer 201, a first conductive layer 202, a sensing insulation layer 203, a second conductive layer 204, and a cover insulation layer 205.

In an embodiment, the base layer 201 may be an inorganic layer including any one of silicon nitride, silicon oxynitride, or silicon oxide. Alternatively, the base layer 201 may be an organic layer including an epoxy resin, an acrylic resin, and/or an imide-based resin. The base layer 201 may have a single layer structure, and/or a multilayer structure of layers laminated along the third direction DR3.

In an embodiment, each of the first sensing conductive layer 202 and the second sensing conductive layer 204 may have a single layer structure and/or a multilayer structure of layers laminated along the third direction DR3.

In an embodiment, a single conductive layer structure may include a metal layer and/or a transparent conductive layer. The metal layer may include molybdenum, silver, titanium, copper, aluminum, and/or an alloy thereof. The transparent conductive layer may include a transparent conductive oxide such as indium-tin oxide (ITO), indium-zinc oxide (IZnO), zinc oxide (ZnO), indium-zinc-tin oxide (IZTO) and/or the like. Besides, the transparent conductive layer may include a conductive polymer such as poly(3,4-ethylenedioxythiophene) (PEDOT), a metal nano-wire, graphene and/or the like.

In an embodiment, the conductive layer of the multilayer structure may include metal layers. For example, the metal layers may have a three-layer structure of titanium/aluminum/titanium. The conductive layer of the multilayer structure may include at least one metal layer and at least one transparent conductive layer.

In an embodiment, at least one of the sensing insulation layer 203 and the cover insulation layer 205 may include an inorganic film. The inorganic layer may include at least any one of aluminum oxide, titanium oxide, silicon oxide, silicon oxynitride, zirconium oxide or hafnium oxide.

In an embodiment, at least one of the sensing insulation layer 203 and the cover insulation layer 205 may include an organic film. The organic film may include at least one of an acrylic-based resin, a methacrylic-based resin, polyisoprene, a vinyl-based resin, an epoxy-based resin, a urethane-based resin, a cellulose-based resin, a siloxane-based resin, a polyimide based-resin, a polyamide-resin, or a parylene-based resin.

In an embodiment, the anti-reflection layer 300 may be disposed on the sensor layer 200. The anti-reflection layer 300 may include a division layer 310, a plurality of color filters 320, and a planarization layer 330.

In an embodiment, the division layer 310 may be disposed to overlap a conductive pattern of the second conductive layer 204. The cover insulation layer 205 may be disposed between the division layer 310 and the second conductive layer 204. In another embodiment of the invention, the cover insulation layer 205 may be omitted.

In an embodiment, the division layer 310 may prevent reflection of external light caused by the second conductive layer 204. A material defining the division layer 310 may be used without limitation if the material absorbs light. The division layer 310 is a layer having black color, and, in an embodiment, may include a black coloring agent. The black coloring agent may include a black dye and/or a black pigment. The black coloring agent may include carbon black, a metal such as chromium, and/or an oxide thereof.

In an embodiment, a divided opening 310-OP may be defined in the division layer 310. The divided opening 310-OP may overlap the light emitting layer EL. The color filter 320 may be disposed in correspondence to the divided opening 310-OP. A color filter 320 may transmit light provided from the light emitting layer EL overlapping the color filter 320.

In an embodiment, the planarization layer 330 may cover the division layer 310 and the color filter 320. The planarization layer 330 may include an organic material, and provide a planar surface on the top surface of the planarization layer 330. In an embodiment of the invention, the planarization layer 330 may be omitted.

In an embodiment of the invention, the anti-reflection layer 300 may include a reflection adjustment layer instead of the color filter 320. For example, the color filter 320 in FIG. 4 may be omitted, and the reflection adjustment layer may be added to the position where the color filter 320 is omitted. The reflection adjustment layer may selectively absorb light in a partial band of light reflected inside a display panel and/or an electronic apparatus, or light incident from the outside of the display panel and/or the electronic apparatus.

As an example, an embodiment of the reflection adjustment layer may absorb light in a first wavelength band of about 490 nm to about 505 nm and in a second wavelength band of about 585 nm to about 600 nm to cause the light transmittance to be about 40% or smaller in the first wavelength band and the second wavelength band. The reflection adjustment layer may absorb light of wavelengths outside the wavelength ranges of red, green, and blue light emitted from the light emitting layer EL. In this way, the reflection adjustment layer may prevent or minimize reduction of the luminance of the display panel and/or electronic apparatus by absorbing the light of wavelengths that do not belong to the red, green, or blue light emitted from the light emitting layer EL. In addition, degradation of the light emission efficiency of the display panel and/or electronic apparatus may also be prevented or minimized, and the visibility may be improved.

In an embodiment, the reflection adjustment layer may be provided with an organic material layer including a dye, a pigment, or a combination thereof. The reflection adjustment layer may include a tetraazaporphyrin (TAP)-based compound, a porphyrin-based compound, a metal porphyrin-based compound, an oxazine-based compound, a squarylium-based compound, a triarylmethane-based compound, a polymethine-based compound, an anthraquinone-based compound, a phthalocyanine-based compound, an azo-based compound, a perylene-based compound, a xanthene-based compound, a diimmonium-based compound, a dipyrromethene-based compound, a cyanine-based compound, or a combination thereof.

In an embodiment, the reflection adjustment layer may have the light transmittance of about 64% to about 72%. The light transmittance of the reflection adjustment layer may be adjusted according to the content of the dye and/or pigment included in the reflection adjustment layer.

In an embodiment of the invention, the anti-reflection layer 300 may include the division layer 310, a plurality of color filters 320, and a polarization film instead of the planarization layer 330. For example, the anti-reflection layer 300 may include a phase retarder and/or a polarizer. The phase retarder may be a film type or a liquid crystal coating type, and include a λ/2 phase retarder and/or a λ/4 phase retarder. The polarizer may also be a film type, and include a stretchable synthetic resin film. The phase retarder and/or the polarizer may further include protection films. The phase retarder and the polarizer themselves or the protection films may be defined as the base layer of the anti-reflection layer 300.

Figure 5:
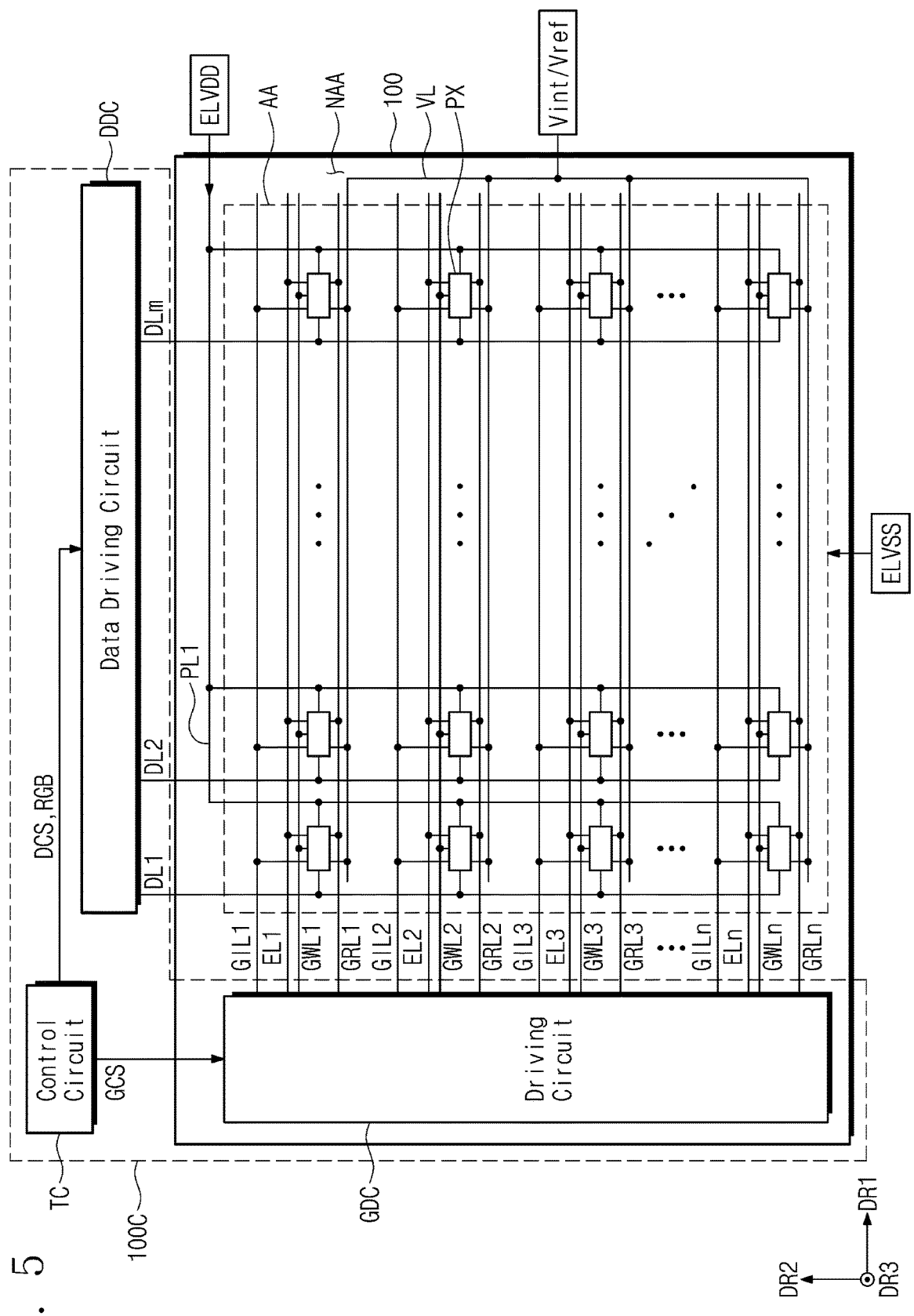
FIG. 5 is a schematic block diagram of a display layer and a display control unit according to an embodiment of the invention.

FIG. 5 is a schematic block diagram of the display layer 100 and the display driver 100C according to an embodiment of the invention.

In an embodiment and referring to FIG. 5, the display driver 100C may include a control circuit TC, a data driving circuit DDC, and a driving circuit GDC. The driving circuit GDC may be embedded in the display layer 100, and each of the data driving circuit DDC and the control circuit TC may be provided in a driving chip type.

In an embodiment, the display layer 100 may include a display area AA corresponding to the active area 1000A (see FIG. 1) and a non-display area NAA corresponding to the non-active area 1000NA (see FIG. 1). The term "corresponding to" includes the meaning of overlapping, and does not mean that two subject areas are the same.

In an embodiment, the plurality of pixels PX may be disposed in the display area AA. The driving circuit GDC for driving the plurality of pixels PX may be provided in the non-display area NAA. In an embodiment of the invention, at least a portion of the driving circuit GDC may also be disposed in the display area AA.

In an embodiment, the driving circuit GDC may be directly provided on the base layer 110 (see FIG. 4) through photolithography processes. The driving circuit GDC may be provided through a process of providing pixel circuits of the plurality of pixels PX. The control circuit TC controls driving of the driving circuit GDC and the data driving circuit DDC. The control circuit TC may convert the data format of input image signals so as to meet the interface specification with the data driving circuit DDC to generate the image data RGB. The control unit TC outputs the image data RGB and/or various types of control signals DCS, GCS.

In an embodiment, the driving circuit GDC receives the first control signal GCS from the control circuit TC. The first control signal GCS may include a vertical start signal for starting the operation of the driver GDC, a clock signal for determining output times of signals or the like. The driving circuit GDC outputs a plurality of scan signals to the plurality of scan lines GWL1 to GWLn, GRL1 to GRLn, and GIL1 to GILn to be described below. In addition, the driving circuit GDC generates a plurality of emission control signals, and outputs the emission control signals to the plurality of emission signal lines EL1 to ELn.

In an embodiment, the data driving circuit DDC receives the second control signal DCS and the image data RGB from the control circuit TC. The data driving circuit DDC converts the image data RGB into data signals, and outputs the data signals to a plurality of data lines DL1 to DLm to be described below. The data signals have analog voltages corresponding to gradation values of the image data RGB.

In an embodiment, the display panel DP includes the plurality of scan lines GIL1 to GILn, GRL1 to GRLn, GWL1 to GWLn, the plurality of emission signal lines EL1 to ELn, the plurality of data lines DL1 to DLm, and the plurality of pixels PX. The plurality of scan lines GWL1 to GWLn, GRL1 to GRLn, GIL1 to GILn extend in the first direction DR1 and are arranged in a second direction DR2 that is orthogonal to the first direction DR1. The plurality of emission signal lines EL1 to ELn may be respectively arranged in parallel to the corresponding scan lines among the plurality of scan lines GWL1 to GWLn, GRL1 to GRLn, GIL1 to GILn. The plurality of data lines DL1 to DLm may be insulated from and intersect with the plurality of scan lines GWL1 to GWLn, GRL1 to GRLn, GIL1 to GILn.

In an embodiment, the plurality of scan lines GWL1 to GWLn, GRL1 to GRLn, GIL1 to GILn may include a plurality of write scan lines GWL1 to GWLn, a plurality of compensation scan lines GRL1 to GRLn, and a plurality of initialization scan lines GIL1 to GILn. Each of the plurality of pixels PX is connected to the corresponding write scan line among the plurality of write scan lines GWL1 to GWLn, the corresponding compensation scan line among the plurality of compensation scan lines GRL1 to GRLn, the corresponding emission signal line among the plurality of initialization scan lines GIL1 to GILn, and the corresponding data line among the plurality of data lines DL1 to DLm.

In an embodiment, the display layer 100 receives the first power supply voltage ELVDD and the second power supply voltage ELVSS. The first power supply voltage ELVDD may be provided to the plurality of pixels PX through a first power line PL1. The second power supply voltage ELVSS may be provided to the plurality of pixels PX through a second power line PL2 (see FIG. 6A).

In an embodiment, the display layer 100 receives an initialization voltage Vint and a reference voltage Vref. The initialization voltage Vint and the reference voltage Vref may be provided to the plurality of pixels PX through the voltage line VL.

Figure 6A:
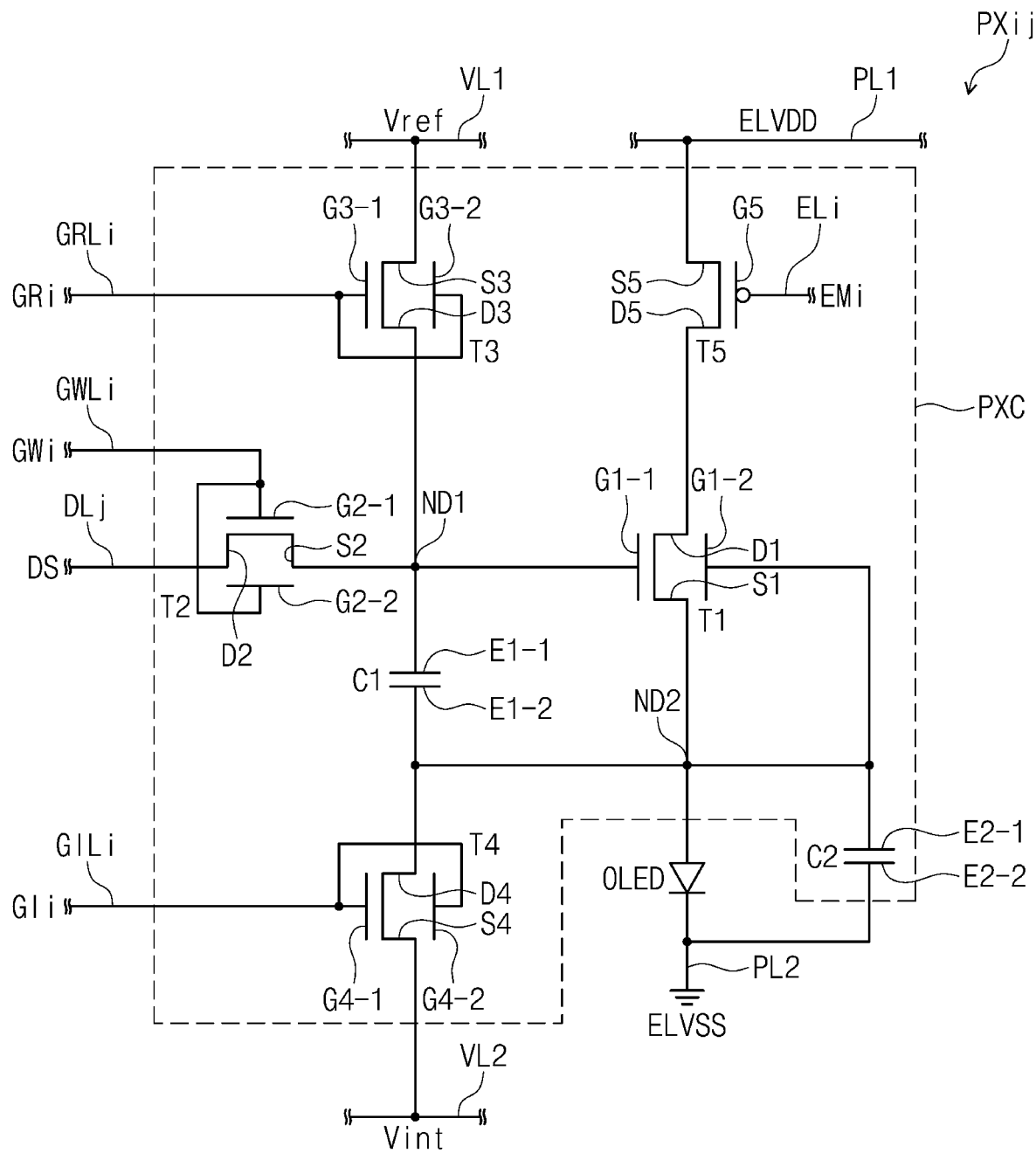
FIG. 6A is an equivalent circuit diagram of a pixel according to an embodiment of the invention.
Figure 6B:
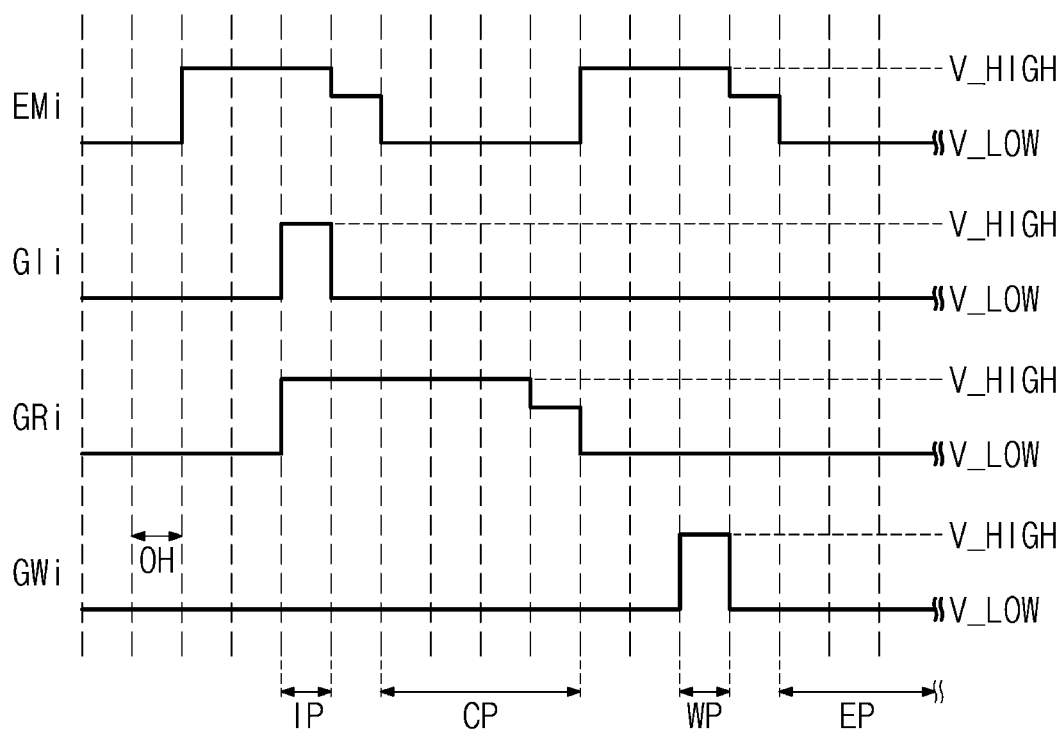
FIG. 6B is a waveform diagram of driving signals for driving the pixel shown in FIG. 6A according to an embodiment of the invention.

FIG. 6A is an equivalent circuit diagram of a pixel PXij according to an embodiment of the invention. FIG. 6B is a waveform diagram of the driving signals for driving the pixel PXij shown in FIG. 6A.

In an embodiment and referring FIG. 6A, the pixel PXij may include a pixel circuit PXC and a light emitting element OLED electrically connected to the pixel circuit PXC.

In an embodiment, the pixel PXij may be electrically connected to a j-th data line DLj among the data lines DL1 to DLm, an i-th scan lines GILi, GRLi, GWLi among the scan lines GIL1 to GILn, GRL1 to GRLn and GWL1 to GWLn, respectfully, and an i-th emission signal line ELi among the emission signal lines EL1 to ELn. The i-th scan lines GILi, GRLi and GWLi may be referred to below as an initialization scan line GILi, a compensation scan line GRLi, and a write scan line GWLi.

In an embodiment of the invention, the pixel circuit PXC may include first to fifth transistors T1 to T5, respectively, a first capacitor C1, and a second capacitor C2. The first to fifth transistors T1 to T5, respectively, may be referred to as pixel transistors. The pixel PXij shown in FIG. 6A is merely an example, and the circuit configuration of the pixel PXij may be modified in various ways. For example, in an embodiment of the invention, at least one of the first to fifth transistors T1 to T5, respectively, may be omitted, and/or an additional transistor may be further included in the pixel PXij.

In an embodiment of the invention, each of the first to fifth transistors T1 to T5, respectively, may be an N-type thin-film transistor and/or a P-type thin-film transistor. FIG. 6A shows an example in which each of the first to fourth transistors T1 to T4, respectively, is an N-type thin-film transistor, and the fifth transistor T5 is a P-type thin-film transistor, but the embodiment is not limited thereto. The first transistor T1 may be referred to as a driving thin-film transistor, the second transistor T2 as a switching thin-film transistor, the third transistor T3 as a compensation thin-film transistor, the fourth transistor T4 as an initialization thin-film transistor, and the fifth transistor T5 as an emission control thin-film transistor.

In an embodiment, each of the first to fourth transistors T1 to T4, respectfully, are shown as including two gates, but at least one transistor may include only one gate. Upper gates G2-1, G3-1, G4-1 and lower gates G2-2, G3-2, G4-2 of the second to fourth transistors T2 to T4, respectively, are shown as being electrically connected to each other, but the embodiment is not limited thereto. The respective lower gates G2-2, G3-2, G4-2 of the second to fourth transistors T2 to T4, respectively, may be floating electrodes.

In an embodiment, a node to which the first upper gate G1-1 of the first transistor T1 is connected is defined as a first node ND1, and a node to which a source S1 of the first transistor T1 may be defined as a second node ND2.

In an embodiment, the light emitting element OLED includes the first electrode AE (see FIG. 4) electrically connected to the second node ND2, the second electrode CE (see FIG. 4) configured to receive the second power supply voltage ELVSS, and the light emitting layer EL (see FIG. 4) disposed between the first electrode AE and the second electrode CE.

In an embodiment, the first transistor T1 is electrically connected between the first power line PL1 configured to receive the first power supply voltage ELVDD and the second node ND2. The first transistor T1 may include a source S1 (hereinafter, a first source) connected to the second node ND2, a drain D1 (hereinafter, a first drain), a semiconductor area, and the first upper gate G1-1 electrically connected to the first node ND1. The first transistor T1 may further include the first lower gate G1-2 connected to the second node ND2.

In an embodiment, the second transistor T2 is electrically connected between the j-th data line DLj and the first node ND1. The second transistor T2 may include a source S2 (hereinafter, a second source) connected to the first node ND1, a drain D2 (hereinafter, a second drain) connected to the j-th data line DLj, a semiconductor area, and the gate G2-1 (hereinafter, a second upper gate) connected to the write scan line GWLi. The second transistor T2 may further include the gate G2-2 (referred to as a second lower gate) electrically connected to the second upper gate G2-1.

In an embodiment, the third transistor T3 is electrically connected between the first node ND1 and the first voltage line VL1 configured to receive the reference voltage Vref. The third transistor T3 may include a drain D3 (hereinafter, a third drain) connected to the first node ND1, a source S3 (hereinafter, a third source) connected to the first voltage line VL1, and the third upper gate G3-1 connected to the compensation scan line GRLi. The third transistor T3 may further include the third lower gate G3-2 electrically connected to the third upper gate G3-1.

In an embodiment, the fourth transistor T4 is electrically connected between the second power line VL2 configured to receive the initialization voltage Vint and the second node ND2. The fourth transistor T4 may include a drain D4 (hereinafter, a fourth drain) connected to the second node ND2, a source S4 (hereinafter, a fourth source) connected to the second voltage line VL2, a semiconductor area, and a fourth upper gate G4-1 connected to the initialization scan line GILi. The fourth transistor T4 may further include a fourth lower gate G4-2 electrically connected to the fourth upper gate G4-1.

In an embodiment, the fifth transistor T5 may be connected between the first power line PL1 and the first drain D1. In the embodiment, the fifth transistor T5 may include a source S5 (hereinafter, a fifth source) connected to the first power line PL1, a drain D5 (hereinafter, a fifth source) connected to the first drain D1, a semiconductor area, and a fifth gate G5 connected to the i-th emission signal line ELi.

In an embodiment, the first capacitor C1 may be electrically connected between the first node ND1 and the second node ND2. The first capacitor C1 includes a first electrode E1-1 connected to the first node ND1, and a second electrode E1-2 connected to the second node ND2.

In an embodiment, the second capacitor C2 is electrically connected between the second power line PL2 and the second node ND2. The second capacitor C2 includes a first electrode E2-1 connected to the second node ND2, and a second electrode E2-2 connected to the second power line PL2.

In an embodiment, the operation of the pixel PXij will be described more specifically with reference to FIGS. 5, 6A, and 6B. The display layer 100 displays an image for each frame period. The plurality of write scan lines GWL1 to GWLn, the plurality of compensation scan lines GRL1 to GRLn, the plurality of initialization scan lines GIL1 to GILn, and the plurality of emission signal lines EL1 to ELn are sequentially scanned during the frame period.

In an embodiment, FIG. 6B shows a portion of the frame period. Referring to FIGS. 6A and 6B, each of the scan signals EMi, GRi, GWi, GIi may have a high voltage V-HIGH (or a high level) during a partial period, and have a low voltage V-LOW (or a low level) during a partial period. The foregoing first to fourth N-type transistors are turned on, when the corresponding scan signal has the high voltage V-HIGH. The fifth P-type transistor T5 is turned on, when the corresponding scan signal has the low voltage V-LOW.

In an embodiment, during an initialization period IP, the third transistor T3 and the fourth transistor T4 are turned on. The first node ND1 is initialized to the reference voltage Vref. The second node ND2 is initialized to the initialization voltage Vint. The first capacitor C1 is initialized with a value of the difference between the reference voltage ref and the initialization voltage Vint. The second capacitor C2 is initialized with a value of the difference between the second power supply voltage ELVSS and the initialization voltage Vint.

In an embodiment, during a compensation period CP, the third transistor T3 and the fifth transistor T5 are turned on. The first capacitor C1 is compensated with a voltage corresponding to a threshold voltage of the first transistor T1.

In an embodiment, during a write period WP, the second transistor T2 is turned on. The second transistor T2 outputs a voltage corresponding to a data signal DS. Consequently, the first capacitor C1 is charged to a voltage corresponding to the data signal DS. The first capacitor C1 is charged to the data signal DS in which the threshold voltage of the first transistor T1 is compensated. The threshold voltage of the first transistor T1 may be different for each of the pixels PX (see FIG. 5), and the pixel PXij shown in FIG. 6A may provide a current to the light emitting element OLED, the current having the amplitude proportional to the data signal DS regardless of a deviation of the threshold voltage of the first transistor T1.

Thereafter, in an embodiment, during an emission period EP, the fifth transistor T5 is turned on. The first transistor T1 provides to the light emitting element OLED a current corresponding to the voltage stored in the first capacitor C1. The light emitting element OLED may emit light at a luminance corresponding to the data signal DS.

Figure 7:
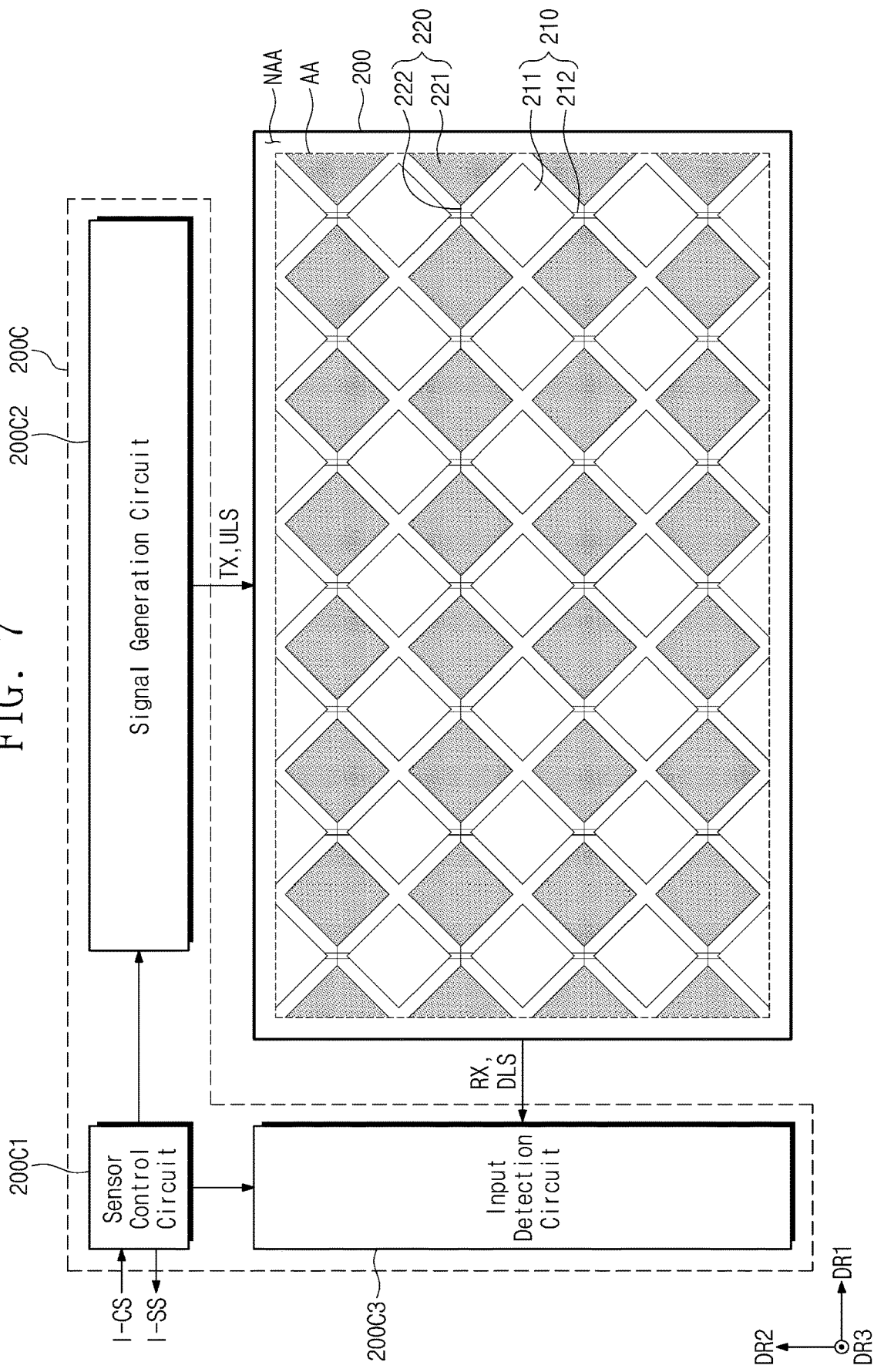
FIG. 7 is a block diagram of a sensor layer and a sensor driver according to an embodiment of the invention.

FIG. 7 is a block diagram of the sensor layer 200 and the sensor driver 200C according to an embodiment of the invention.

In an embodiment and referring to FIG. 7, the sensor layer 200 may include a plurality of first sensing electrodes 210 and a plurality of second sensing electrodes 220 disposed in the display area AA. The plurality of second sensing electrodes 220 may respectively intersect with the plurality of first sensing electrodes 210.

In an embodiment, each of the plurality of first sensing electrodes 210 may extend along the second direction DR2 and be spaced apart and arranged in the first direction DR1. Each of the plurality of second sensing electrodes 220 may extend along the first direction DR1 and be spaced apart and arranged in the second direction DR2.

In an embodiment, each of the plurality of first sensing electrodes 210 may include a sensing pattern 211 and a connection pattern 212. Adjacent two of the sensing patterns 211 may be electrically connected by two of the connection patterns 212, but the embodiment is not limited thereto. The sensing patterns 211 and the connection patterns 212 may be arranged on different layers.

In an embodiment, each of the plurality of second sensing electrodes 220 may include a first portion 221 and a second portion 222. The first portion 221 and the second portion 222 may have an integrated shape, and be arranged on the same layer. For example, the first portion 221 and the second portion 222 may be arranged on the same layer as the sensing patterns 211. Two of the connection patterns 212 may be insulated from and intersect with the second portion 222.

In an embodiment, the sensor layer 200 may further include a plurality of trace lines electrically connected to the first sensing electrodes 210 and the second sensing electrodes 220, respectively. The trace lines may be arranged in the non-display area NAA, but are not limited thereto. For example, at least some of the trace lines may overlap the display area AA.

In an embodiment, the sensor driver 200C may receive a control signal I-CS from the main driver 1000 (see FIG. 2). The sensor driver 200C may provide a coordinate signal I-SS to the main driver 1000 (see FIG. 2).

In an embodiment, the sensor driver 200C may be implemented with an integrated circuit (IC) and be directly mounted in a prescribed area of the sensor layer 200, or mounted on a separate printed circuit board in a chip on film (COF) type to be electrically connected to the sensor layer 200.

In an embodiment, the sensor driver 200C may include a sensor control circuit 200C1, a signal generation circuit 200C2, and an input detection circuit 200C3. The sensor control circuit 200C1 may control the operations of the signal generation circuit 200C2 and the input detection circuit 200C3 on the basis of the control signal I-CS. The sensor control circuit 200C1, the signal generation circuit 200C2, and the input detection circuit 200C3 are not separate components that are physically divided. For example, the sensor control circuit 200C1, the signal generation circuit 200C2, and the input detection circuit 200C3 may be functionally divided according to their operations, and implemented in a single chip.

In an embodiment, the sensor driver 200C may be selectively driven in a first mode for sensing a passive input or a second mode for sensing an active input.

In an embodiment, in the first mode, the signal sensing circuit 200C2 may sequentially output transmission signals TX to the first sensing electrodes 210 of the sensor layer 200. The input detection circuit 200C3 may receive sensing signals RX from the sensor layer 200. For example, the input detection circuit 200C3 may receive the sensing signals RX from the second sensing electrodes 220. In an embodiment of the invention, the signal generation circuit 200C2 may sequentially output the transmission signals TX to the second sensing electrodes 220 of the sensor layer 200, and the input detection circuit 200C3 may receive the sensing signals RX from the first sensing electrodes 210.

In an embodiment, in the second mode, the signal generation circuit 200C2 may output the uplink signals ULS to the sensor layer 200. For example, the uplink signals ULS may be provided to the first sensing electrode 210, the second sensing electrodes 220, or all of the first sensing electrodes 210 and the second sensing electrodes 220. Then, the input detection circuit 200C3 may receive the downlink signals DLS from the first sensing electrodes 210 and the second sensing electrodes 220.

In an embodiment, the input detection circuit 200C3 may convert analog signals to digital signals. For example, the input detection circuit 200C3 may amplify the received analog signals and then filter the amplified signals. In other words, the input detection circuit 200C3 may convert the filtered signals to digital signals.

Figure 8:
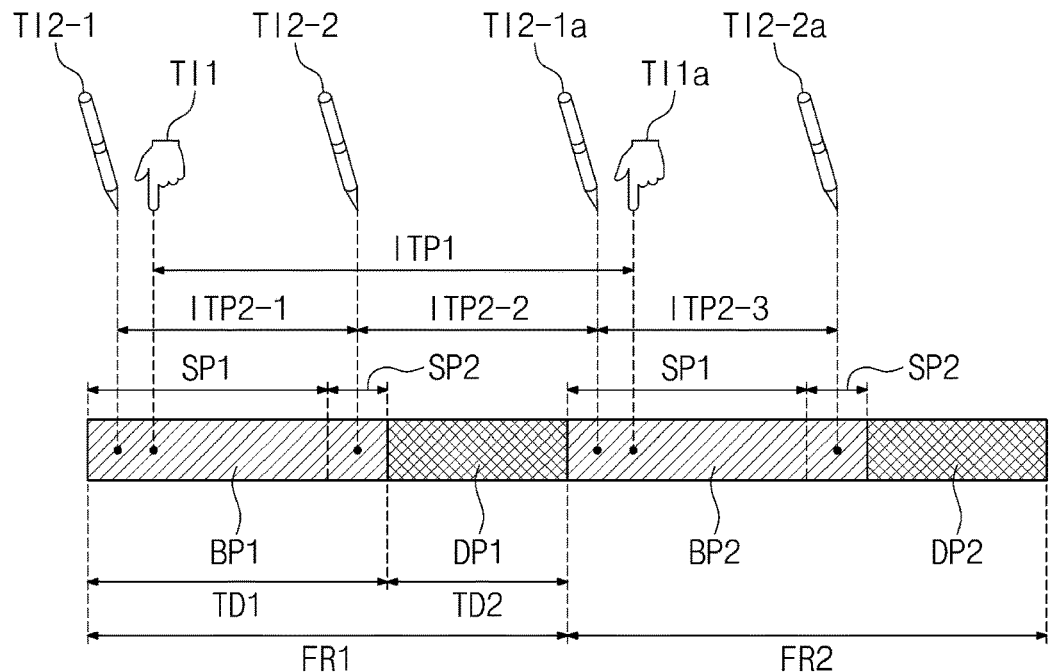
FIG. 8 is a graphical block diagram showing operations of a display layer and a sensor layer according to an embodiment of the invention.

FIG. 8 shows the operations of the display layer 100 and the sensor layer 200 according to an embodiment of the invention.

In an embodiment and referring to FIGS. 3 and 8, the display layer 100 may operate in units of one frame. FIG. 8 shows two example frames, for example, a first frame FR1 and a second frame FR2 following the first frame FR1.

In an embodiment, the first frame FR1 may include a blank period BP1 and a data input period DP1. The second frame FR2 may include a blank period BP2 and a data input period DP2. The display layer 100 may be updated with new data for every one frame. Each of the blank period BP1, BP2 may be referred to as a vertical blank period, and each of the data input periods DP1, DP2 may be referred to as a data transmission period. For example, the frame period shown in FIG. 6B may be a portion of the data input period DP1.

In an embodiment, the sensor layer 200 may be driven to sense a first type input TI1 and second type inputs TI2-1, TI2-2 in the blank period BP1. The first type input TI1 and the second type inputs TI2-1, TI2-2 may be different type inputs. The first type input TI1 may correspond to an input by a touch 3000, and the second type inputs TI2-1, TI2-2 may correspond to inputs by the input device 2000 configured to output the downlink signals DLS.

In an embodiment of the invention, the number of times that the sensor layer 200 senses the second type inputs TI2-1, TI2-2 in one frame is larger than that of sensing the first time input TI1. For example, in the blank period BP1 of the first frame FR1, the sensor layer 200 is driven once to sense the first type input TI1, and is driven twice to sense the second type inputs TI2-1, TI2-2. Accordingly, in the blank period BP1 of the first frame FR1, the sensor driver 200C may be configured to operate once in the first mode for sensing an input by the touch 3000, and operate twice in the second mode for sensing the input by the input device 2000.

In an embodiment of the invention, a frame frequency of the display layer 100 may be the same as a sensing frequency corresponding to a period in which the sensor layer 200 senses the first type input TI1. Accordingly, the first type input TI1 may be sensed once in the first frame FR1, and a first type input TI1a may be sensed once in the second frame FR2 following the first frame FR1. For example, when the frame frequency is about 120 Hz, the sensing frequency for sensing the first type input TI1 may be about 120 Hz. Accordingly, a time interval ITP1 between a start time of an operation for sensing the first type input TI1 in the first frame FR1 and a start time of an operation for sensing the first type input TI1a in the second frame FR2 may correspond to about 8.33 ms (milliseconds) that is the reciprocal of the frame frequency. In addition, an image to be displayed on the display layer 100 may be updated in an about 8.33 ms period.

In an embodiment of the invention, a first duration TD1 of the blank period BP1 may be longer than a second duration TD2 of the data input period DP1. For example, when the frame frequency of the display layer 100 is about 120 Hz, the first duration TD1 of the blank period BP1 may be about 4.7 ms or longer, and the duration TD2 of the data input period DP1 may be about 3.6 ms or shorter. However, this is merely an example, and the embodiment is not particularly limited thereto.

In an embodiment, a first frame frequency of the display layer 100 may be about 120 Hz, and the duration of the blank period is about 2 ms. In this case, the duration of the data input period is about 6.3 ms. According to an embodiment of the invention, the second duration TD2 of the data input period DP1 may be reduced due to an extended blank period BP1 within one frame. For example, when the first frame frequency of the display layer 100 is about 120 Hz, the second duration TD2 of the data input period DP1 may be about 3.6 ms or shorter. In other words, the second duration TD2 of the data input period DP1 may become shorter in a similar way that the display layer 100 is driven at a higher frame frequency, for example about 240 Hz, than the frame frequency of about 120 Hz.

In an embodiment and referring to FIG. 6B, a 1H time OH is shown. The 1H time OH according to an embodiment of the invention may correspond to a 1H time calculated with a frame frequency higher than the frame frequency at which the display layer 100 is actually driven. According to an embodiment of the invention, the length of the compensation period CP in which the threshold voltage of the first transistor T1 (see FIG. 6A) is compensated may be 4H time. Even when the blank period BP1 extends to reduce the duration TD2 of the data input period DP1 and to reduce the 1H time OH too, the duration of the compensation period CP may be sufficiently secured to 2H time or longer. Accordingly, without degradation of image quality of the display layer 100, the first duration TD1 of the blank period BP1 may be adjusted so that the sensitivity of the sensor layer 200 is improved.

In an embodiment of the invention, the blank period BP1 may have a first sub-period SP1 and a second sub-period SP2 following the first sub-period SP1. The duration of the first sub-period SP1 may correspond to half of the reciprocal of the frame frequency of the display layer 100. For example, the duration of the first sub-period SP1 may be about 4.17 ms. The duration of the second sub-period SP2 may be shorter than about 1 ms or longer than about 0 ms. In this case, the duration of the blank period BP1 may be at most about 5.17 ms. The duration of the blank period BP1 may be about 5.17 ms or less.

In an embodiment, the sensing frequency corresponding to the period in which the sensor layer 200 senses the second type inputs TI2-1, TI2-2 may be higher than the frame frequency of the display layer 100, and may be, for example, double the frame frequency. For example, when the frame frequency is about 120 Hz, the sensing frequency for sensing the second type inputs TI2-1, TI2-2 may be about 240 Hz. A time interval ITP2-1 between a start time of an operation for sensing the second type input TI2-1 in the first frame FR1 and a start time of an operation for sensing the second type input TI2-2 in the first frame FR1 may be about 4.17 ms.

In an embodiment, the sensor layer 200 may be driven to sequentially sense the second type input T12-1 and the first type input TI1 in the first sub-period SP1, and to sense the second type input TI2-1 in the second sub-period SP2. In addition, the sensor driver 200C may be configured to sequentially operate in the second mode and the first mode in the first sub-period SP1, and operate in the second mode in the second sub-period SP2. Accordingly, the sensor layer 200 may sense all of the input by the input device 2000 and the input by the touch 3000 in the blank period BP1. When the external input is sensed in a period in which data is not input to the display layer 100, noise generated in a signal may be reduced or minimized. Accordingly, the sensitivity of the sensor layer 200 may be enhanced to improve the sensing performance.

Figure 9:
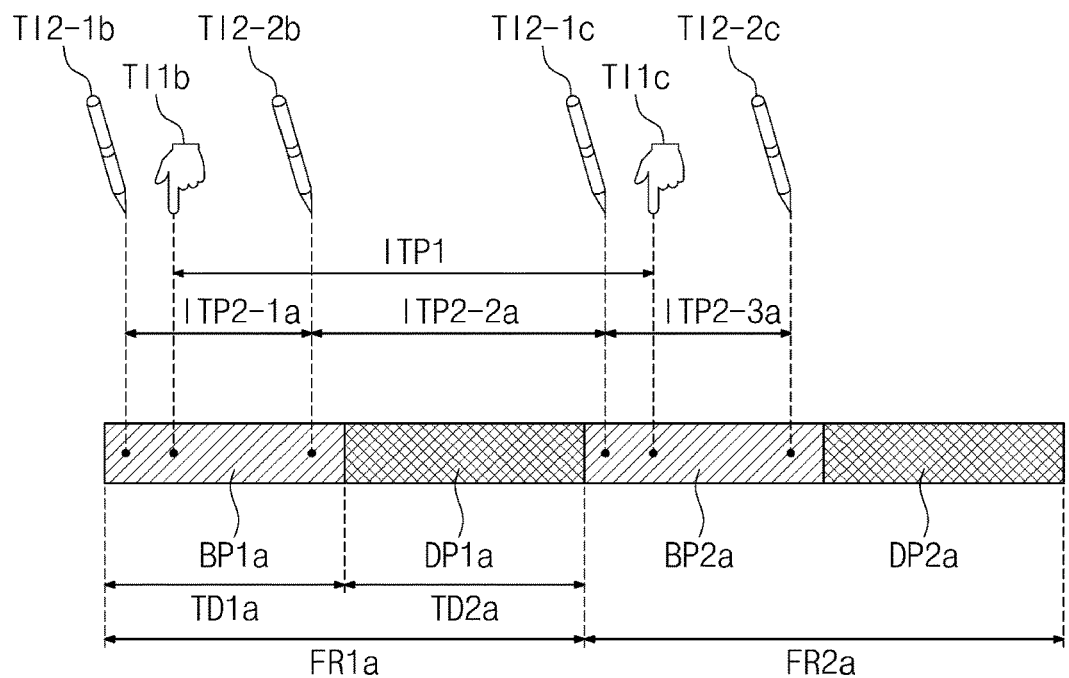
FIG. 9 is a graphical block diagram showing operations of a display layer and a sensor layer according to an embodiment of the invention.

FIG. 9 shows the operations of the display layer 100 and the sensor layer 200 according to an embodiment of the invention.

In an embodiment and referring to FIGS. 3 and 9, the display layer 100 may operate in unit of one frame. FIG. 9 shows two example frames of a first frame FR1a and a second frame FR2a following the first frame FR1a.

In an embodiment, the first frame FR1a may include a blank period BP1a and a data input period DP1a. The second frame FR2a may include a blank period BP2a and a data input period DP2a. The display layer 100 may be updated with new data for every one frame.

In an embodiment of the invention, a first duration TD1a of the blank period BP1a may be at most a second duration TD2a of the data input period DP1a. The first duration TD1a of the blank period BP1a may be less than or equal to the second duration TD2a of the data entry period DP1a. For example, when the frame frequency of the display layer 100 is about 120 Hz, the first duration TD1a of the blank period BP1a may be about 4.17 ms or shorter, and the duration TD2 of the data input period DP1 may be about 4.17 ms or longer.

In an embodiment, the sensor layer 200 may be driven to sequentially sense, in the blank period BP1a, a 2-1st type input TI2-1b, a first type input TI1b, and a 2-2nd type input TI2-2b.

In an embodiment of the invention, a frame frequency of the display layer 100 may be the same as a sensing frequency corresponding to a period in which the sensor layer 200 senses the first type input TI1b. Accordingly, the first type input TI1b may be sensed once in the first frame FR1a, and a first type input TI1c may be sensed once in the second frame FR2a following the first frame FR1a. For example, when the frame frequency is about 120 Hz, the sensing frequency for sensing the first type input TI1b may be about 120 Hz. Accordingly, a time interval ITP1 between a start time of an operation for sensing the first type input TI1b in the first frame FR1a and a start time of an operation for sensing the first type input TI1c in the second frame FR2a may correspond to about 8.33 ms that is the reciprocal of the frame frequency. In addition, an image to be displayed on the display layer 100 may be also updated in an about 8.33 ms period.

In an embodiment of the invention, a sensing frequency corresponding to a period in which the sensor layer 200 senses the second type inputs TI2-1b, TI2-2b may be higher than the frame frequency of the display layer 100. Accordingly, a first time interval ITP2-1a between a start time of an operation for sensing the 2-1st type input TI2-1b and a start time of an operation for sensing the 2-2nd type input TI2-2b may be shorter than an update period of an image displayed on the display layer 100. In an embodiment of the invention, the first time interval ITP2-1a may be at least half of the duration TD1a of the blank period BP1a, but is not particularly limited thereto.

According to an embodiment of the invention, in order to sense both of the 2-1st type input TI2-1b and the 2-2st type input TI2-2b in the blank period BP1a, the first time interval ITP2-1a between a start time of an operation for sensing the 2-1st type input TI2-1b and a start time of an operation for sensing the 2-2nd type input TI2-2b may be reduced to be at most half of the reciprocal of the frame frequency of the display layer 100. In addition, a second time interval ITP2-2a between a start time of an operation for sensing the 2-2nd type input TI2-2b in the first frame FR1a and a start time of an operation for sensing the 2-1st type input TI2-1c in the second frame FR2a following the first frame FR1a may expand to be at least half of the reciprocal of the frame frequency. Accordingly, the first time interval ITP2-1a may be shorter than the second time interval ITP2-2a. A third time interval ITP2-3a between a start time of an operation for sensing a 2-1st type input TI2-1c in the second frame FR2a and a start time of an operation for sensing a 2-2nd type input TI2-2c in the second frame FR2a may be substantially the same as the first time interval ITP2-1a.

In an embodiment, the sensor layer 200 may sense all of the input by the input device 2000 and the input by the touch 3000 in the blank period BP1a. As a result, when the external input is sensed in a period in which data is not input to the display layer 100, noise generated in a signal may be reduced or minimized. Accordingly, the sensitivity of the sensor layer 200 may be enhanced to improve the sensing performance.

In an embodiment, according to the described above, the sensor layer may sense in the blank period both of the input through an input device and the input by touch. As a result, as an external input is not sensed in a period in which data is not input to the display layer, noise generated in a signal may be reduced or minimized. Accordingly, the sensitivity of the sensor layer is enhanced to improve the sensing performance.

While this invention has been described with reference to embodiments thereof, it will be clear to those of ordinary skill in the art to which the invention pertains that various changes and modifications may be made to the described embodiments without departing from the spirit and technical area of the invention as defined in the appended claims and their equivalents. Thus, the scope of the invention shall not be restricted or limited by the foregoing description, but be determined by the broadest permissible interpretation of the following claims.

What is claimed is:

1. An electronic device comprising:
a display layer comprising pixels and configured to operate in units of one frame comprising a blank period and a data input period; and
a sensor layer disposed on the display layer, and configured to sense a first type input and a second type input, wherein the second type input is different from the first type input,
wherein the sensor layer is driven to sense the first type input and the second type input in the blank period, and, wherein in one frame, a number of times that the second type input is sensed is greater than a number of times that the first type input is sensed,
wherein the blank period comprises a first sub-period and a second sub-period following the first sub-period, and wherein a duration of the first sub-period is at least three times a duration of the second sub-period,
wherein the display layer is driven at a first frame frequency, and a 1H time of the display layer corresponds to a 1H time calculated with a second frame frequency which is higher than the first frame frequency,
wherein each of the pixels comprises a pixel circuit comprising a driving transistor and a light emitting element electrically connected to the pixel circuit, and
wherein a threshold voltage of the driving transistor is configured to be compensated in a compensation period, wherein a duration of the compensation period is at least 2H times of the display layer.

2. The electronic device of claim 1, wherein a frame frequency of the display layer is equal to a sensing frequency corresponding to a period in which the sensor layer senses the first type input.

3. The electronic device of claim 1, wherein a first duration of the blank period is longer than a second duration of the data input period.

4. The electronic device of claim 3, wherein a sensing frequency corresponding to a period in which the sensor layer senses the second type input is double a frame frequency of the display layer.

5. The electronic device of claim 1, wherein a duration of the second sub-period is shorter than about 1 ms or longer than about 0 ms.

6. The electronic device of claim 1, wherein the sensor layer is driven to sense the second type input and the first type input in the first sub-period, and to sense the second type input in the second sub-period.

7. An electronic device comprising:
a display layer comprising pixels and configured to operate in units of one frame comprising a blank period and a data input period; and
a sensor layer disposed on the display layer, and configured to sense a first type input and a second type input, wherein the second type input is different from the first type input,
wherein the sensor layer is driven to sense the first type input and the second type input in the blank period, and, wherein in one frame, a number of times that the second type input is sensed is greater than a number of times that the first type input is sensed, wherein the sensor layer is driven to sequentially sense a 2-1st type input corresponding to the second type input, the first type input, and a 2-2nd type input corresponding to the second type input in the blank period,
wherein a first time interval, in a first frame, between a start time of an operation for sensing the 2-1st type input and a start time of an operation for sensing the 2-2nd type input is shorter than a second time interval between the start time of the operation for sensing the 2-2nd type input in the first frame and a start time of an operation for sensing the 2-1st type input in a second frame following the first frame,
wherein the display layer is driven at a first frame frequency, and a 1H time of the display layer corresponds to a 1H time calculated with a second frame frequency which is higher than the first frame frequency,
wherein each of the pixels comprises a pixel circuit comprising a driving transistor and a light emitting element electrically connected to the pixel circuit, and
wherein a threshold voltage of the driving transistor is configured to be compensated in a compensation period, wherein a duration of the compensation period is at least 2H times of the display layer.

8. The electronic device of claim 7, wherein the first time interval is at most half of a reciprocal of a frame frequency of the display layer.

9. The electronic device of claim 7, wherein the second time interval is at least half of a reciprocal of a frame frequency of the display layer.

10. An electronic device comprising:
a display layer comprising pixels and configured to operate in units of one frame comprising a blank period and a data input period;
a sensor layer disposed on the display layer; and
a sensor driver configured to drive the sensor layer,
wherein the sensor driver in the blank period is configured to operate once in a first mode in which an input by a touch is sensed, and to operate twice in a second mode in which an input by an input device configured to output a downlink signal is sensed,
wherein the sensor layer is configured to sequentially sense a 2-1st type input corresponding to the input by the input device, a first type input corresponding to the input by the touch, and a 2-2nd type input corresponding to the input by the input device,
wherein a first time interval, in a first frame, between a start time of an operation for sensing the 2-1st type input and a start time of an operation for sensing the 2-2nd type input is less than or equal to a second time interval between the start time of the operation for sensing the 2-2nd type input in the first frame and a start time of an operation for sensing the 2-1st type input in a second frame following the first frame,
wherein the blank period comprises a first sub-period and a second sub-period following the first sub-period, and a duration of the first sub-period corresponds to half of a reciprocal of a frame frequency of the display layer,
wherein the display layer is driven at a first frame frequency, and a 1H time of the display layer corresponds to a 1H time calculated with a second frame frequency which is higher than the first frame frequency,
wherein each of the pixels comprises a pixel circuit comprising a driving transistor and a light emitting element electrically connected to the pixel circuit, and
wherein a threshold voltage of the driving transistor is configured to be compensated in a compensation period, wherein a duration of the compensation period is at least 2H times of the display layer.

11. The electronic device of claim 10, wherein a first duration of the blank period is longer than a second duration of the data input period.

12. The electronic device of claim 11, wherein a second duration of the second sub-period is shorter than about 1 ms and longer than about 0 ms, and
wherein the sensor driver is configured to sequentially operate in the second mode and the first mode in the first sub-period, and operate in the second mode in the second sub-period.

13. The electronic device of claim 10, wherein a duration of the blank period is at most a duration of the data input period.

14. The electronic device of claim 10, wherein a frame frequency of the display layer is equal to a first sensing frequency corresponding to a period in which the sensor layer operates in the first mode, and
wherein a second sensing frequency corresponding to a period in which the sensor layer operates in the second mode is higher than the first sensing frequency.

* * * * *